United States Patent
Liashenko et al.

(10) Patent No.: US 12,162,207 B2
(45) Date of Patent: Dec. 10, 2024

(54) DEVICE AND METHOD FOR DETERMINING THE SPEED OF PRINTING OF A FIBER AND THE LENGTH OF A PRINTED FIBER

(71) Applicants: Universitat Rovira I Virgili; Institucio Catalana De Recerca I Estudis Avancats, Barcelona (ES)

(72) Inventors: Ievgenii Liashenko, Eugene, OR (US); Andreu Cabot Codina, Barcelona (ES); Joan Rosell Llompart, Tarragona (ES)

(73) Assignee: University of Oregon, Eugene, OR (US)

( * ) Notice: Subject to any disclaimer, the term of this patent is extended or adjusted under 35 U.S.C. 154(b) by 336 days.

(21) Appl. No.: 17/609,311

(22) PCT Filed: May 5, 2020

(86) PCT No.: PCT/EP2020/062448
§ 371 (c)(1),
(2) Date: Nov. 5, 2021

(87) PCT Pub. No.: WO2020/225259
PCT Pub. Date: Nov. 12, 2020

(65) Prior Publication Data
US 2022/0219382 A1   Jul. 14, 2022

(30) Foreign Application Priority Data
May 7, 2019  (EP) .................................... 19382350

(51) Int. Cl.
*B29C 64/112*   (2017.01)
*B29C 64/209*   (2017.01)
(Continued)

(52) U.S. Cl.
CPC .......... *B29C 64/112* (2017.08); *B29C 64/209* (2017.08); *B33Y 10/00* (2014.12); *B33Y 30/00* (2014.12)

(58) Field of Classification Search
CPC ... B29C 64/112; B29C 64/209; B29C 64/106; B29C 64/386; B33Y 30/00; B33Y 50/02; B33Y 10/00; D01D 5/0092
See application file for complete search history.

(56) References Cited

U.S. PATENT DOCUMENTS 3,060,429 A * 10/1962 Winston .................. H04L 15/28
                                                                  346/111
8,162,450 B2    4/2012 Barbet
(Continued)

FOREIGN PATENT DOCUMENTS

EP        2714405 A1    4/2014

OTHER PUBLICATIONS

International Search Report and Written Opinion of the International Searching Authority, mailed Jul. 23, 2020, for International Application No. PCT/EP2020/062448, 11 pages.
(Continued)

*Primary Examiner* — S. Behrooz Ghorishi
(74) *Attorney, Agent, or Firm* — Klarquist Sparkman, LLP

(57) ABSTRACT

The method for determining the speed of printing of a fiber and the length of a printed fiber comprises: supplying ink to a nozzle; forming an ink drop at the exit of said nozzle; generating an ink jet carrying a net electrostatic charge; deflecting said ink jet periodically by one or a plurality of jet-deflection electrodes; collecting the ink jet on a substrate repetitively forming a printed motif by means of a continuous fiber; determining the width of the printed motif; calculating the speed of printing of fiber from the frequency of
(Continued)

Conventional
EHD jet printing
(unknown fiber speed/length)

Invention
(measurement of fiber collection speed and collected fiber length)

Fiber speed is a product of a length of one jet-deflection motif and jet-deflection frequency the jet-deflection signal and the width of the printed motif; calculating the length of fiber printed in a time interval from the frequency of the jet-deflection signal and from the width of the printed motif.

20 Claims, 4 Drawing Sheets

(51) Int. Cl.
*B33Y 10/00* (2015.01)
*B33Y 30/00* (2015.01)

(56) References Cited

U.S. PATENT DOCUMENTS

| | | | |
|---|---|---|---|
| 8,906,285 B2 | 12/2014 | Aksay et al. | |
| 2008/0074477 A1 | 3/2008 | Schmitt | |
| 2009/0233057 A1* | 9/2009 | Aksay | D01D 5/0038 |
| | | | 427/469 |
| 2015/0266297 A1* | 9/2015 | Lee | B41J 2/06 |
| | | | 347/50 |
| 2017/0216918 A1 | 8/2017 | Orem-Marmarelis | |

OTHER PUBLICATIONS

International Search Report and Written Opinion of the International Searching Authority, mailed Aug. 5, 2020, for International Application No. PCT/EP2020/062454, 9 pages.

\* cited by examiner

DEVICE AND METHOD FOR DETERMINING THE SPEED OF PRINTING OF A FIBER AND THE LENGTH OF A PRINTED FIBER

CROSS REFERENCE TO RELATED APPLICATIONS

This is the U.S. National Stage of International Application No. PCT/EP2020/062448, filed May 5, 2020, which claims priority to European Application No. EP19382350.7, filed May 7, 2019.

The present invention refers to a device and a method for determining the speed of printing of a fiber and the length of a printed fiber in electrohydrodynamic jet printing.

BACKGROUND OF THE INVENTION

The electrohydrodynamic (EHD) jetting phenomenon generates a fast moving and fine ink jet, which in EHD jet printing is collected on a substrate. The ink flows out of a channel through a small opening. We refer to this channel with small opening as nozzle. We refer to a collected jet as fiber. Virtually any liquid may be used for EHD jetting, which we will refer to as ink. This ink may typically comprise any suitable combination of solvents, polymers, inorganic precursors, particles, and living cells. The jet diameter typically ranges from dozens of nanometers to a few micrometers. The jet is generally continuous but may break up spontaneously into liquid fragments (droplets) before it is collected; however, the invention does not relate to this scenario.

EHD jetting can be used with mechanical translation of the substrate or the nozzle to position the jet at predefined locations on a substrate, thus enabling the printing of solid items (structures, patterns, objects, etc.) from predefined designs. We will refer to EHD jet printing as the creation of such items using an EHD jet which is continuous and does not break up into droplets. The point of contact of the fiber with the substrate can be adjusted by deflecting the ink jet from its default trajectory (namely, the trajectory that the jet would follow if no jet-deflection electrodes were present) by using one or a plurality of jet-deflection electrodes that modify the electrostatic field around the jet during its fly from the nozzle to the substrate. In the practicing of the EHD jet printing method, it is often necessary to know the speed of the jet as it arrives to the substrate, which here we refer to as the fiber collection speed or the collection speed of fiber.

Fibers find application in a broad range of fields including energy and electronics (such as batteries, fuel cells, capacitors, nanogenerators, and sensors) and biomedical applications (such as scaffolding in tissue engineering, drug delivery, and wound healing). The properties and performances of an EHD jet printed item depend on chemical composition of fiber, its morphology and alignment, as well as on the total length of fiber that has been used for printing. Thus, accurate measurement and control of the collection speed of fiber and the length of collected fiber comprising an item is critical for producing items by EHD jet printing which will have predefined and consistent performance.

In the current state-of-the-art, the fiber collection speed is quantified by gradually increasing the speed of the translation stage. The fiber collection speed is determined by observing the shape of the printed fiber. As the speed of the translation stage is increased, the fiber collection speed is known to equal the stage translational speed when a straight fiber is collected instead of a wavy/buckled fiber. A limitation of the current state-of-the-art is that it is difficult to perform such experiment during printing, because it becomes necessary to inspect the microscopic organization of the fiber, and this is best done with a high magnification microscope capable of resolving the individual fiber. Thus, the fiber collection speed is generally determined before or after the printing, requiring additional amounts of time. The length of collected fiber in a given time can be then determined by multiplying the fiber collection speed by the collection time.

Another state-of-the-art method quantifies the fiber collection speed through image analysis of the collected fiber tracks, by computing the length of collected fiber in a given time. This method is laborious as it involves microscopic imaging of the individual fiber and analyzing said images. By way of example, this can be done by applying a predefined threshold to the image of the individual fiber and converting it into an image composed of white and black pixels. This allows computing the percentage of pixels representing the fiber compared to the total number of pixels on image. To practice said method, the value corresponding to the buckled individual fiber is compared to the value corresponding to the straight fiber, which is used as a calibration, and for which the fiber speed is known and equals the speed of stage translation. This method to quantify the length of collected fiber can be used only if the fiber collection speed is not significantly larger than the speed of the translational stage defining the item, in which case the fiber would accumulate by piling up into a confused three-dimensional mass. The quantification of fiber collection speed by said method is not feasible once the collected fiber is accumulated forming many layers which overlap each other, thus making the overlapped portions of fiber effectively invisible. Another inherent limitation of this method is the risk of an incorrect interpretation of calculated pixels. For example, the increase in fiber diameter or shade resulting from the roughness of the substrate or even the contamination present on substrate can be wrongly interpreted by said method as an increase in the length of collected fiber. Another limitation of this method is that it is difficult to perform such experiment during actual printing of a predefined design, because it becomes necessary to inspect the microscopic organization of the fiber, and this is best done with a very high magnification microscope to image the individual fiber.

While continuous jet must be generated in a continuous fashion, a multitude of droplets can be generated either continuously or intermittently ("on demand"), depending on the ejection mechanism:

Intermittent droplet generation ("drop-on-demand") can be actuated by applying bursts of energy to liquid interphase, overcoming the surface tension, thus ejecting a portion of liquid ink and propelling it away from the liquid interphase.

Such intermittent or "on demand" droplet formation is based on creating a pressure wave strong enough to overcome surface tension and to separate a portion of ink from the liquid interphase. Multiple phenomena can be used to trigger such pressure wave, such as: piezoelectric, thermal, acoustic, etc., and were extensively studied and applied in ink-jet printing.

Jet-based droplet generation is achieved by first forming a continuous jet of ink, which subsequently undergoes Plateau-Rayleigh instability, where the surface tension forces develop swells on the jet which grow in time, eventually breaking off into separate ink portions or droplets. Such jet breakup is spontaneous but can also be controlled/triggered by feeding sound waves to the jet.

Liquid breakup happens by the action of surface tension forces (working towards minimizing the surface area) and is resisted and slowed down by the action of viscoelastic forces. The relative importance of these forces, thus the jet breakup behavior, strongly depends on ink composition. For some inks, such as polymer melts, jet breakup does not occur due to high viscosity of polymeric melts.

Furthermore, at equal resolution or width of the printing line, continuous jetting is advantageous because it can carry more volume of ink compared with intermittent jetting of droplets, where the jet is effectively interrupted between ejecting ink portions (switched on and off, where no material is ejected for large portion of pulsing period).

Additionally, continuous droplet generation has the disadvantage that droplet diameter is always larger than the jet diameter, which is detrimental to the printing resolution, or requires smaller jets for the same printing resolution than printing based on continuous-fiber deposition. This situation becomes even worse when droplets impact on the printing substrate and splash, increasing the contact area and further decreasing printing resolution. On the other hand, sufficiently solid fiber typically keeps its shape when deposited, resulting both in smaller voxel size and much higher aspect ratio, which are essential for microscopic 3D printing.

Continuous fiber deposition has yet another benefit for 3D printing of continuous features, such as lines and walls obtained by stacking of multiple fiber-layers. Such continuous features are useful in applications such as electronics, for creating conducting paths/electrodes, and scaffolds for tissue engineering, for example.

On the other hand, to obtain such features by printing of droplets, multiple droplets must be carefully positioned next to each other, which is a disadvantage which only gets more persistent as the printed pattern becomes more complex (for example, as a wall becomes taller). This is due to the "autofocusing effect" which attracts electrically charged droplets to places such as the crossing of 2 walls and results in printing defects such as pillars located on those crossings. Such challenges in the fidelity of the printed structure can be overcome by printing with a continuous fiber.

An additional benefit of fiber vs. droplet printing is the possibility to fabricate fibers from multiple materials, either by varying the fiber composition along the fiber length (switching printing materials) or by creating multiple material fibers (such as core-shell or empty tubes) by simultaneously feeding multiple materials through the nozzle, forming a compound jet.

Yet another benefit of fiber printing is that a sufficiently solid fiber can be suspended between two contact points in three dimensions, which can be hardly achieved by droplet-based printing.

Multiple benefits of printing with continuous fibers over printing using droplets are higher printing speed, higher resolution, higher freedom in ink formulation, and better 3D printing fidelity especially when 3D-printing continuous features.

The present invention bypasses the limitations of current approaches to determine the collection speed of a fiber and the length of collected fiber. While current approaches rely on microscopic imaging capable of resolving individual fibers, the present method is based on the inspection of the printed item without the need of resolving individual fibers.

DESCRIPTION OF THE INVENTION

With the method according to the present invention it is possible to solve said limitations, providing other advantages that are described below.

The method for determining the collection speed of a fiber and the length of collected fiber comprises the following steps:
   supplying ink from a reservoir to a nozzle;
   forming an ink drop at the exit of said nozzle;
   generating an ink jet;
   printing a predefined design on a substrate to produce a printed item;
   analyzing the printed item;
   wherein the method also comprises the step of deflecting said ink jet by an electrostatic field generated by one or a plurality of jet-deflection electrodes during printing, while the substrate or the nozzle can be moved either during printing or before and after printing.

Advantageously, the ink jet is deflected from its default trajectory in one direction or two directions within the plane normal to the default jet trajectory.

Preferably, the ink jet is generated by the action of an electrostatic field. In this case, the nozzle is connected to a voltage source, so that a voltage can be applied to the liquid, which provides it with an electrical potential relative to that of the other electrodes and of the substrate.

Furthermore, the ink is supplied from the reservoir to the nozzle continuously.

Virtually any solid with sufficient electrical conductivity can be used as a substrate. The substrate may incorporate several materials, may have any dimensions, may be geometrically shaped other than as a flat/planar surface, and may even be flexible, deformable, porous, etc.

In this invention, the EHD jet is deflected from its default trajectory periodically while the stage can move relative to the nozzle to print a predefined 2D or 3D design. The relative motion between the stage and the nozzle can be achieved in a printing device either by translating the substrate or the nozzle. The jet is deflected periodically by applying periodically repeating signals to the jet-deflection electrodes. Consequently, when the stage is not moving, a repeating motif will produce the stacking of layers of fiber producing a motif 3D item, whereas, when the stage moves continuously during printing, the printed item contains a repeating motif that defines a strip. The motif 3D item or the motif strip can be much wider than the fiber, and can therefore be quantified by using standard optical equipment which is not necessarily capable of resolving individual fibers. Therefore, the width (i.e. the breadth) of the printed motif strip or of the motif 3D item can be easily determined by analysis of optical images, even during the printing process. The stage translation speed and the amplitude and frequency of the jet-deflection signals are preset and thus known parameters. The collection speed of fiber is computed by multiplying the frequency of the jet-deflection signal by the length of fiber deposited in one period of jet-deflection, namely, the length of deposited fiber contained within the repeating motif. The length of fiber deposited in one period is computed from the width of the collected fiber motif strip or width of the motif 3D item, which is determined from its visual inspection, without having to resolve individual fibers. The length of fiber deposited in one period of jet-deflection signal is computed by relating said width to the geometry of the predefined design.

By way of non-limiting example, we describe several scenarios, in which the surface collecting the EHD jet is a flat plane, it is set perpendicular to the default trajectory of the jet, and that said substrate is attached to the stage, moves relative to the nozzle in some direction, and the plane moves along the plane itself. In the first case scenario, the jet-deflection can be confined to a plane perpendicular to the substrate, which in addition is perpendicular to the direction of the stage translation. In this case, the length of fiber printed in one period of jet-deflection signal is determined as two times the square root of the square of the width of the motif strip plus the square of the distance translated by the stage in half period, which equals the translation speed multiplied by the period of jet deflection signal divided by two:

$$\text{Length of fiber printed in one period of jet deflection} = 2\times[(\text{width of fiber motif strip})^2+(\text{translation speed}\times 0.5\times\text{period of jet deflection})^2]^{1/2}$$

In the second case scenario the jet-deflection is confined to a plane perpendicular to the substrate, but which is not perpendicular to the direction of the stage or nozzle translation. In this case, the length of the fiber collected in one period of jet-deflection signal can be computed as two times the width of the motif strip divided by the sine of the angle between the direction of the jet-deflection (intersection of the plane of jet deflection and the substrate) and the direction of the stage translation. Said angle is a preset parameter of the printing process. Corrections to this calculation can be introduced to account for the stage translation speed.

In the third case scenario, the jet-deflection can be preset to a circular motion, in which case the width of the motif strip printed on the substrate will be the same irrespectively of the direction of the stage translation. In this case, the printed figure will be a cycloid, whereas, from the reference frame (point of view) of the nozzle, the point of contact of the EHD jet on the substrate describes one circle in every period. Therefore, the length of fiber collected in one period of jet-deflection signal equals the circumference of this circle which can be easily determined as the product of the width of the motif strip (circle diameter) multiplied by Pi (Π).

To practice the method according to the present invention, the collected fiber must not be buckled, as it would be more difficult to determine the length of fiber collected in one period of jet-deflection if the EHD jet buckles upon collection. To ensure that no buckled fiber is collected, sufficiently high amplitude of jet-deflection signal must be applied. Once the fiber is collected following a predefined design without buckling, further increase in the amplitude of jet-deflection signal will not result in increased width of the printed item (motif strip or motif 3D object), as its width is limited by the collection speed of fiber (the length of fiber collected in a set time).

The method according to the present invention yields more precise values for jet collection speed and collected fiber length when the fiber collected in one period is independent of the speed of the substrate or nozzle translation. This situation is achieved when the jet collection speed is substantially higher than the speed of translation of the substrate or nozzle. In addition, the use of jet-deflection signals with high frequencies also contributes to improve the precision of the values measured for the jet collection speed and collected fiber length. More precise determinations of the length of printed fiber and speed of printing can be obtained by introducing additional correction factors accounting for the stage translation speed.

Advantageously, the determination of the fiber collection speed and the fiber length can be done continuously during the printing by means of acquiring images of the printed item without having to resolve individual fibers and analyzing said images, and the printing of the object can be controlled from the information obtained by said analyzed images.

A single jet-deflection electrode can be used to deflect the EHD jet. However, preferably more than one jet-deflection electrode is used. When more than one jet-deflection electrode is used, preferably, the voltages of the jet-deflection electrodes are synchronized for generating said electrostatic field.

The method according to the present invention provides at least the following advantages:

The present invention advantageously allows quantifying the length of collected fiber and the fiber collection speed during its collection or immediately after by a facile and accurate computation based on geometric parameters of an observed printed item that are easy to determine, without the need of resolving individual fibers.

Advantageously this method can be used while printing to control the printing process. The real time computation of the fiber collection speed can be done by continued observation of the width of a printed motif strip or of a motif 3D object. The computed speed can be used online to provide feedback to adjust the printing parameters in order to bring said speed to within a small deviation from a target value. For example, it becomes possible to adjust voltage applied to the nozzle to control the fiber collection speed.

According to a second aspect, the present invention refers to a device for determining the speed of printing of a fiber and the length of a printed fiber by a method as described previously, comprising:
   a nozzle where an ink drop is formed, generating an ink jet carrying a net electrostatic charge;
   one or a plurality of jet-deflection electrodes for deflecting said ink jet periodically;
   a substrate for collecting the ink jet repetitively forming a printed motif by means of a continuous fiber;
   control means for determining the width of the printed motif; calculating the speed of printing of fiber from the frequency of the jet-deflection signal and the width of the printed motif; and calculating the length of fiber printed in a time interval from the frequency of the jet-deflection signal and from the width of the printed motif.

Preferably, the device also comprises one or more waveform generators that generate voltage signals and wherein these signals are amplified and are provided to the jet-deflection electrodes.

Furthermore, the jet-deflection electrodes are preferably connected to amplifiers for amplifying the signals from the generators.

The device also comprises control means that control the deflection of the ink jet and/or the movement of the substrate and/or the nozzle.

Preferably, the opening of the nozzle is wider than the diameter of the ink jet and one or a plurality of cameras monitor the printing process.

In the present invention, continuous jet/fiber is used for printing of 3D structures, where resolution and the speed of printing are essential advantages over previously known methods. To increase the throughput of solid material deposited on the printing substrate, inks with high content of solid constituents are favored.

Advantageously, such inks tend to be very viscous (many orders of magnitude over the inks used for printing in using droplets formed from jet breakup) and thus effectively prohibit the jet breakup by the Plateau-Rayleigh instability.

Furthermore, certain ink components, such as polymers with high molecular weight or with branched molecular chains, significantly increase ink viscosity (even when added in small concentrations) and thus either preclude droplet formation, or must be present in minimal concentrations, which has the disadvantage of drastically decreasing the printing speed.

BRIEF DESCRIPTION OF THE DRAWINGS

For a better understanding of the above explanation and for the sole purpose of providing an example, some non-limiting drawings are included that schematically depict a practical embodiment.

DESCRIPTION OF PREFERRED EMBODIMENTS

Figure 1:
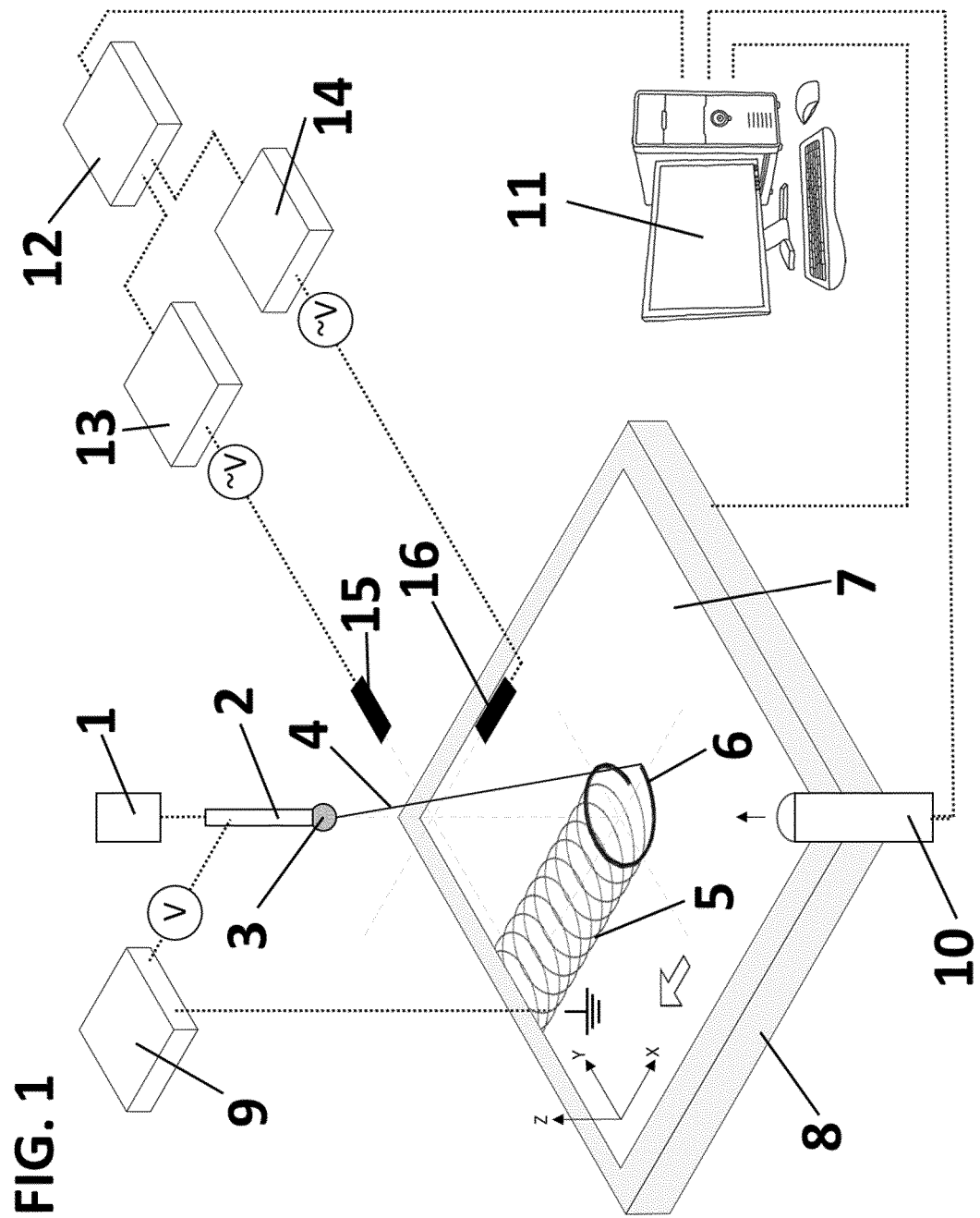
FIG. 1 is a diagrammatical perspective view of a printing device used with the method of the present invention, according to a first example including two jet-deflection electrodes.

FIG. 1 shows a first example of a printing device used with the method according to the present invention, which comprises the following elements, whose operation will be described hereinafter:

1: ink reservoir
2: nozzle that receives ink from the reservoir
3: ink drop at the tip of the nozzle
4: ink jet generated from the ink drop
5: motif strip produced by the printed fiber
6: printed motif (printed during a single period of jet deflection)
7: substrate
8: translation stage controlled by computer and software
9: power supply electrically connected with the nozzle
10: camera for monitoring the printing process
11: computer including software for controlling the printing process
12: generator of jet deflection signals
13, 14: amplifiers of the jet deflection signals coming from the generator
15, 16: jet-deflection electrodes (electrodes for deflecting the jet in the Y and X directions, respectively)

Figure 2:
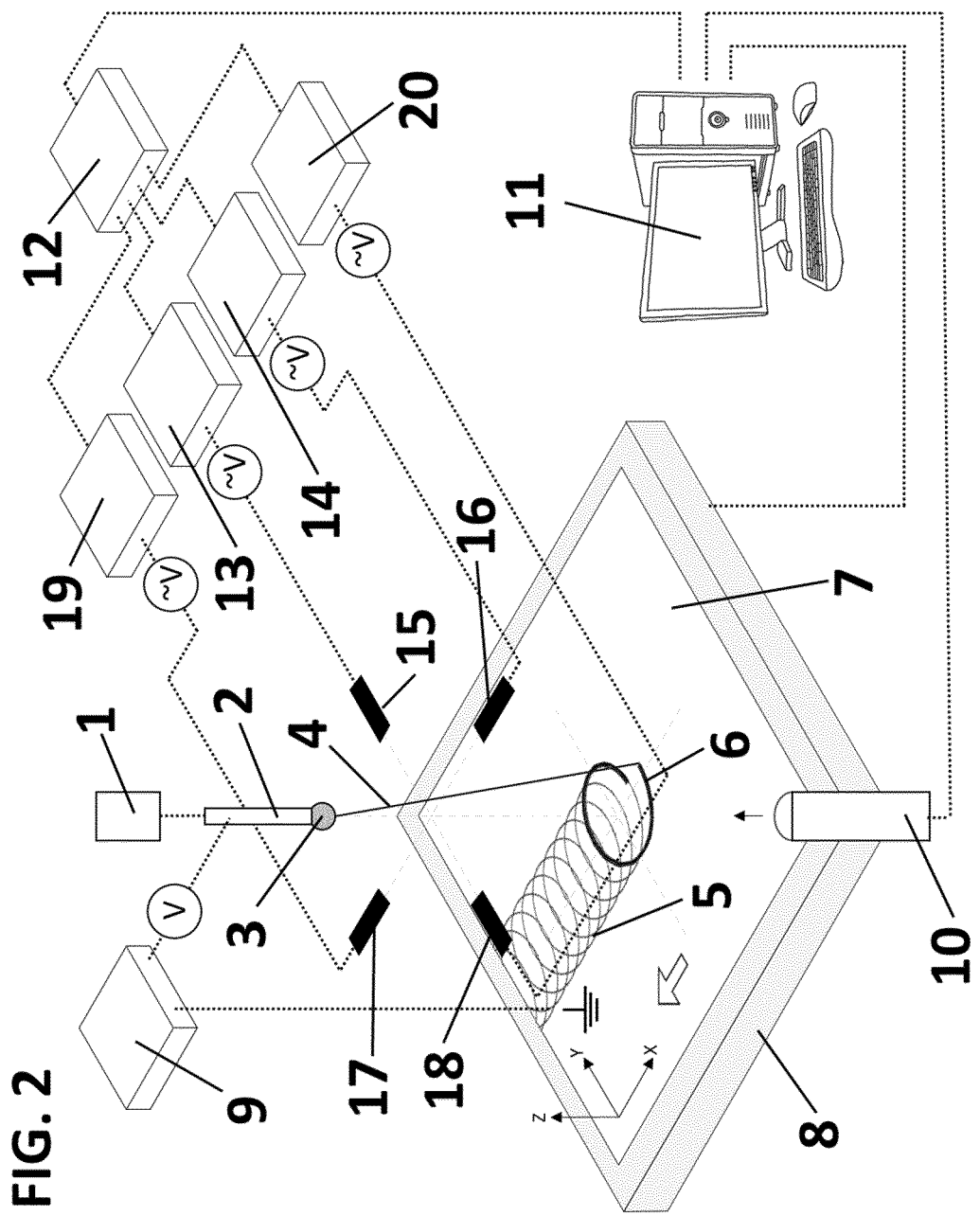
FIG. 2 is a diagrammatical perspective view of a printing device used with the method of the present invention, according to a second example including four jet-deflection electrodes.
Figure 3:
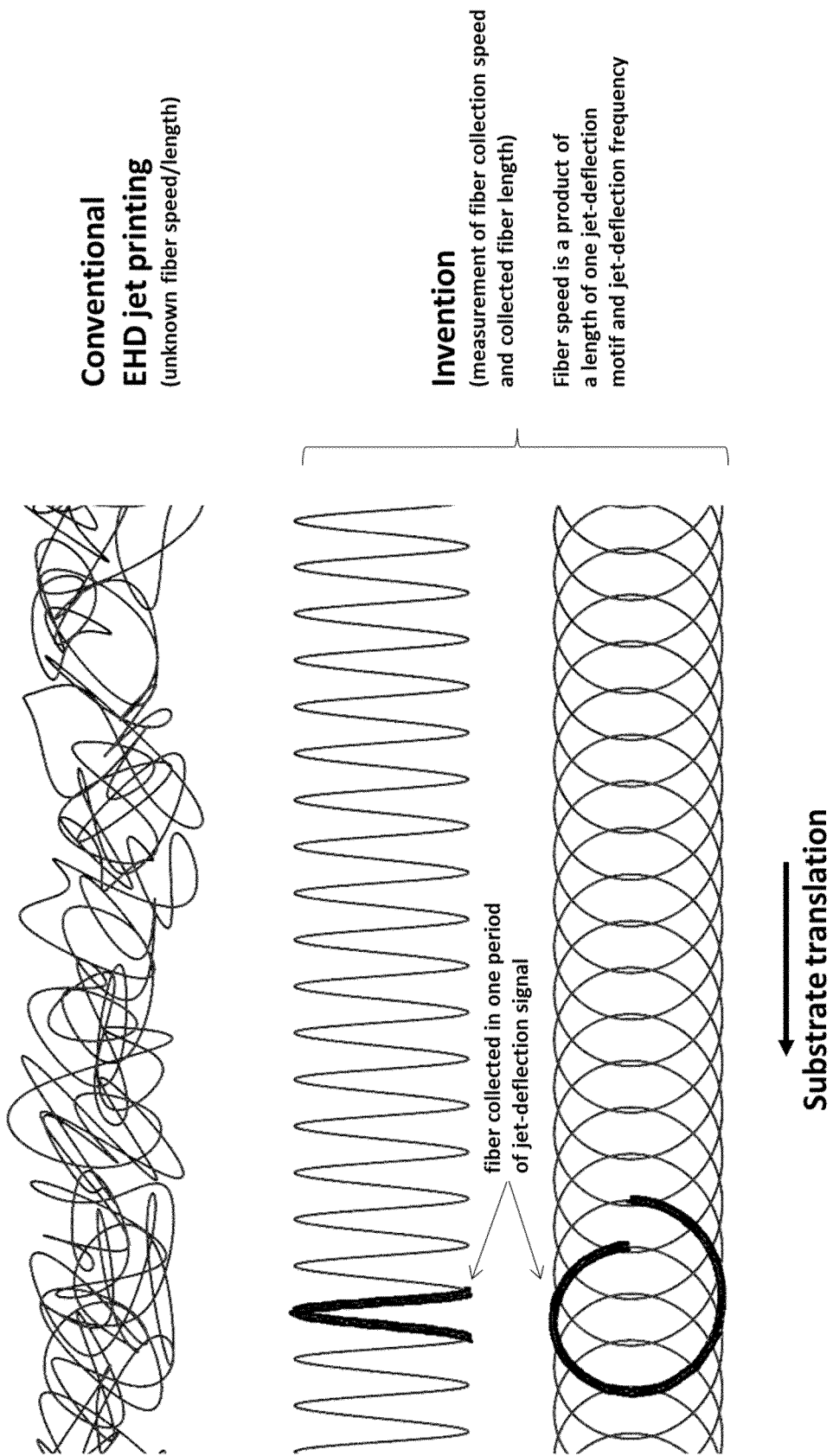
FIG. 3 shows a schematic plan view of the method for measuring the collection speed of a fiber and the amount of collected fiber, for the same amount of fiber and same substrate translation speed.

In FIG. 2 a second example of a device used in the method of the present invention is shown. For simplicity the same numeral references are used for indicating the same elements.

The only difference between both examples is that the second example includes four jet-deflection electrodes 15, 16, 17, 18 and four corresponding amplifiers 13, 14, 19, 20.

In the present description we refer to a liquid jet 4, and when said jet 4 has solidified into a firm and stable shape it is called fiber.

The printing parameters are classified in two groups: 1) Jet generation parameters, namely, the parameters associated with the generation of the EHD ink jet. 2) Jet deflection parameters, namely, the parameters used for controlling the jet's flight trajectory by modifying the electrostatic field surrounding the jet. Hereinafter, relevant parameters which are used for controlling printing process or may influence printing results are discussed.

1) Jet Generation Parameters

The ink flow rate is the volumetric rate at which liquid ink is supplied from reservoir 1 to the tip of the nozzle. In the case when the ink is a melt (from a room temperature solid, for example a molten polymer), a heating system may be incorporated to the reservoir 1 and the nozzle 2 to maintain the ink in a molten state. The nozzle 2 is a thin tube which can be made of conductive or insulating material and typically is square cut (blunt ending) at the drop 3 end. The pendent drop 3 is formed by the ink accumulated at the exit of the nozzle 2. Electrical contact between power supply 9 and pendant drop 3 of liquid ink is necessary. This is typically done by either a wire connected to said power supply, on one end, and to the ink, on the other end; or by a wire connected to said power supply, on one end, and to the nozzle 2, when the nozzle 2 is made of or covered with an electrically conducting material, such as a metal, typically stainless steel or platinum. FIGS. 1 and 2 show this second electrical contact means.

The diameter of the opening of the exit end of the nozzle 2 is another parameter which influences electrostatic field around the pendant drop 3.

The size of the pendant drop 3 influences the surface area of ink/gas interface and thus defines the evaporation rate of any volatile solvent present in the ink from the pendant drop 3. The space surrounding liquid drop can be in vacuum or filled with a gas, which is typically air, but it can be another gas, such as synthetic air, nitrogen, carbon dioxide, or any of these with some small concentration of solvent vapor to limit the rate of solvent evaporation from the pendant drop.

For continuous jet generation, ink composition needs to satisfy rheological requirements: the ink should be viscoelastic enough to prevent the breakup of the jet into fragments or droplets; and the ink should dry fast enough during its flight, to get deposited as an effectively solid (vitreous jet or rubbery jet with enough firmness and stability), which we refer as fiber. When the deposited jet is substantially liquid (which lacks viscoelastic properties and is still able to flow after deposition), the jet will typically accumulate forming undesired features such as big droplets on the substrate 7.

To generate the jet from pendant drop 3, an electrostatic field is established between electrically charged nozzle 2 and electrically earth grounded substrate 7. The jet is generated and accelerated in the Z direction towards substrate 7 by the electrostatic field set between the nozzle 2 and the substrate 7. Alternatively, the same effect can be reached by earth grounding the nozzle 2 and applying a voltage to the substrate 7. Another possibility is to apply a voltage between the nozzle 2 and a ring extractor electrode, which could be placed near pendant drop 3.

The nozzle-to-substrate separation (in Z direction) should be small enough to prevent jet whipping (flailing in the air due to the so called kink instability, also known as bending instability). Typically, the nozzle-to-substrate separation is under 10 mm in EHD jet printing.

Power supply 9 applies a voltage to the nozzle 2 to adjust the electrical potential of the pendant drop 3 relative to that of its surroundings. If the voltage is sufficiently high, pendant drop 3 gets deformed to a pointed (e.g. conical, but not necessarily conical) tip (or jet-ejection point) wherefrom a single jet 4 is ejected towards the substrate 7. The jet develops between the jet-ejection point on the pendant drop 3, where it starts, to the substrate 7, where it ends. As the jet is accelerated due to the pulling by the electrical stresses, its cross-sectional area typically decreases. When the ink is a liquid solution containing volatile components, as the jet 4 moves towards the substrate 7, volatile components (e.g. solvent) may evaporate from it.

A characteristic parameter of the jet 4 is its diameter, which can be constant but more typically varies along the jet length. The diameter of the collected jet (i.e. fiber diameter) is influenced by various factors, most importantly by the ink composition, evaporation rate of its volatile components, and the stretch rate caused by electrical stresses. The fiber typically has circular cross-section, but fibers of other cross-sections are also possible. In case of non-circular fiber its diameter is defined as the equivalent diameter, being the diameter of the printed fiber having equivalent cross-sectional area. Solution-based and melt-based EHD jet printing have different ranges of fiber diameters. Fiber diameter formed from polymer melt ranges between 0.5 µm and 200 µm, more typically in the range between 1 µm and 30 µm. Fiber diameter formed from solvent-based inks ranges between 0.010 µm, and 10 µm, more typically in the range between 0.05 µm and 2 µm.

The speed of the generated EHD jet depends on several parameters: ink composition and rheological properties, ink flow rate, evaporation rate (or solidification rate in case of melt), electrostatic field strength and nozzle-to-substrate separation. Fiber collection speed depends on these parameters on a complex manner that is difficult to predict. The present invention can be used to establish such relationships.

2) Jet Deflection Parameters

"Jet deflection" refers here to the method of controlling the jet's trajectory by modifying the electrostatic field surrounding it. Jet deflection enables active control of the position of jet 4 in the XY plane. It can be used in this invention to create a repeating motif with fiber. The present invention uses the jet deflection, and, optionally, the translation of substrate or nozzle. Jet-deflection can be used to repetitively print a predefined motif by controlling the jet's position with high temporal resolution. When either substrate 7 or nozzle 2 are translated, a repeating sequence of motifs are printed forming a motif strip (the fiber motif strip).

Acceleration of the jet towards the substrate 7 and its deflection in its flight toward the substrate 7 is driven by electrostatic forces or stresses. Such forces are caused by the action of an electrostatic field onto the jet. Such electrostatic field is created and controlled through the electrical potentials applied to several jet-deflection electrodes 15, 16 and nozzle 2 or pendant drop 3. Such electrostatic field can be viewed as the superposition of two electrostatic fields, one responsible for the generation and transport of the EH D jet toward the substrate (jet generation field), and another one (jet-deflection field), responsible for displacing the jet from its default trajectory in directions normal to such trajectory. The jet-deflection field is created by jet-deflection electrodes 15 and 16 (or 15, 16, 17, and 18), which attract or repel the jet 4 along the Y and X directions, correspondingly.

For the sake of simplicity, the following description assumes that the substrate is electrically earth grounded. However, this is one embodiment of the invention, whereas other embodiments are possible in which the same or similar differences in electrical potential between electrodes are maintained, while another electrode, for example the nozzle 2, is electrically earth grounded.

The various situations are not strictly equivalent, as the surroundings of the device also play an electrical influence on the electrostatic field in the printing region, which, although typically small, it is not zero. Those surroundings are typically at the same electrical potential as earth ground; however, a nearby object could change the electrostatic field, distorting the jet's trajectory. In addition, although the simplest embodiment described here assumes only the electrodes described, additional electrodes may be used. For example, in electrospinning and electrospray practice, a "back electrode" is sometimes placed behind the nozzle, and an "extractor electrode" is sometimes placed just ahead of the nozzle to better control the electrostatic field around the drop formed outside the nozzle.

The values of the electrostatic jet-deflection parameters are pre-set typically in a software which is run in a computer 11, and these are used to compute X- and Y-deflection potentials that are generated and amplified by voltage generators 12 and amplifiers 13, 14, and applied to the jet-deflection electrodes 15, 16.

Jet-deflection electrodes geometry, and position (height relative to the pendant drop 3 (parallel to Z axis), and distance from the default jet trajectory (along the X and Y axes) are all important parameters.

Jet-deflection electrodes 15, 16 height from the substrate 7 (along the Z direction) is in the range of between 0 mm and 10 mm, more typically in the range between 1 mm and 4 mm. Electrodes distance from the default jet trajectory (along X and Y directions) is in the range of between 0.1 mm and 2 cm, more typically in the range between 2 mm and 10 mm.

Jet-deflection electrodes positioned near the EHD jet affect the electrostatic field around the jet, perturbing its trajectory or speed. In order not to perturb the jet, a voltage bias can be applied to the jet-deflection electrodes equal to or near the voltage that would be present at their location if the jet-deflection electrodes were not present. In other words, voltage bias makes the jet-deflection electrode electrostatically invisible to the EHD jet 4.

In this method, the main printing parameters are the amplitude and frequency of the signals applied to the jet-deflection electrodes. Amplitude defines the width of the printed item 5 and frequency presets how many times the motif 6 is printed per second.

It must be pointed out that when the fiber is being deflected and printed over a moving collector, the printed item is a motif strip, whereas when it is not moving and the jet deflection is a periodic function of time a 2.5D item is formed, such as a cylinder.

The signals applied to the jet-deflection electrodes are preferably computed by software in a computer 11. The signals can be also applied by a function generator or an AC power supply.

The present invention can be used in different embodiments depending on the number of jet-deflection electrodes used. In the first embodiment, in a 1-electrode-per-axis configuration, 2 independently addressable jet-deflection electrodes 15, 16 are used. In the second embodiment, 4 independently addressable jet-deflection electrodes 15, 16, 17, 18 are used in a 2-electrodes-per-axis configuration.

Other embodiments can be used in which a single jet-deflection electrode is used, or three jet-deflection electrodes are used, or more than four jet-deflection electrodes are used. All such embodiments have the same functionality of being capable of controlling jet positioning during printing. However, the embodiment with one jet-deflection electrode can deflect the jet only in one direction normal to the default jet trajectory, while embodiments with more jet-deflection electrodes can deflect the jet in any direction normal to the default jet trajectory. However, a single jet-deflection electrode is enough to practice the invention.

The following table shows values of parameters used in the device and method according to the present invention.

"Preferred values" represent range of parameter values currently found most useful. "Invention values" envision range of parameter values which theoretically could be used for jet-deflection printing.

| Parameters | Units | Preferred values | Invention values |
|---|---|---|---|
| Ink flow rate | μl/min | 0.01-0.2 | 0.001-1 |
| Diameter of nozzle tip/opening (O.D.) | μm | 50-300 | 5-2000 |
| Diameter of pendant drop | μm | 100-1000 | 20-2000 |
| Temperature | ° C. | 18-25 | 10-200 |
| Relative humidity | % | 30-70 | 0-95 |
| Nozzle-to-substrate separation (along Z axis) | mm | 2-5 | 0.3-10 |
| Nozzle voltage | V (±) | 800-2000 | 200-10000 |
| Fiber collection speed | mm/s | 3-300 | 0.5-5000 |
| Fiber diameter | nm | 50-2000 | 10-10000 |
| Jet-deflection electrodes height (from substrate, along Z direction) | mm | 1-4 | 0-10 |
| Jet-deflection electrodes distance (from default jet trajectory, along X and Y directions) | mm | 2-10 | 0.1-20 |
| Bias voltage | V (±) | 200-500 | 0-2000 |
| Amplitude | V | 100-2000 | 5-10000 |
| Frequency | Hz | 10-500 | 0.1-10000 |
| Number of fiber layers in a printed item | layers | 50-500 | 1-2000 |
| Height of a printed item | μm | 0.05-80 | 0.01-1000 |
| Width of a printed motif | μm | 2-300 | 1-3000 |

Figure 4:
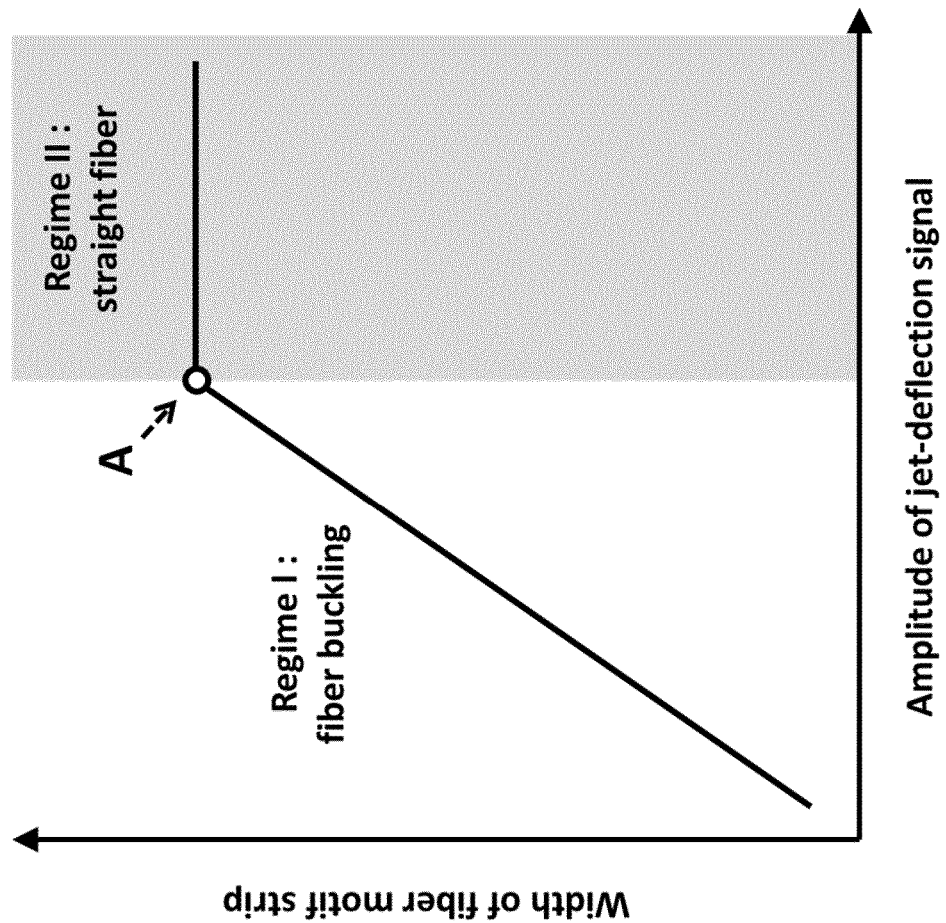
FIG. 4 shows schematically the dependence of the width of the fiber motif strip with the amplitude of the jet deflection signal(s). The width of the fiber motif strip becomes constant at high enough amplitudes, when the fiber does not buckle upon collection.

FIG. 4 shows schematically the dependence of the width of the fiber motif strip with the amplitude of the jet deflection signal(s). This diagram assumes that the frequency and all other setup parameters are kept constant. Two regimes of printing are encountered depending on the amplitude of the jet-deflection signal. Point A shown in FIG. 4 is the condition at which the fiber collection speed is matched by the printing speed. For amplitudes below this point (Regime I) the fiber collection speed exceeds the printing speed, while for amplitudes above this point (Regime II), the situation is reversed. The invention must be practiced in the plateau region, called Regime II in FIG. 4, where the width of collected fiber motif strip is not dependent on the amplitude of the applied jet-deflection signals. To ensure that this requirement is met, the amplitude of jet-deflection signals must be sufficiently high to avoid the collection of buckled fiber.

The printing devices described previously with the method described in this document allow quantifying the collection speed of fiber when using the translational stage 8 to define the printed item 5. The length of fiber collected in a time interval can be computed by multiplying the collection speed of fiber and the duration of the time interval.

Even though reference has been made to a specific embodiment of the invention, it is obvious for a person skilled in the art that the method described herein is susceptible to numerous variations and modifications, and that all of the details mentioned can be substituted for other technically equivalent ones without departing from the scope of protection defined by the attached claims.

The invention claimed is:

1. A method, comprising:
supplying an ink to a nozzle;
forming an ink drop at an exit of the nozzle;
generating a continuous ink jet from the ink drop, wherein the continuous ink jet carries a net electrostatic charge;
deflecting the continuous ink jet by applying a periodically repeating jet deflection signal to one or more jet deflection electrodes;
collecting the continuous ink jet on a substrate to form a continuous fiber on the substrate, wherein the continuous fiber collected in a period of the periodically repeating jet deflection signal forms a printed motif;
determining a width of the printed motif formed during the period of the periodically repeating jet deflection signal; and
determining a speed of printing the continuous fiber as a product of a frequency of the periodically repeating jet deflection signal and a length of the continuous fiber collected in the period of the periodically repeating jet deflection signal, wherein the length of the continuous fiber collected in the period is determined based on a predefined function of the width of the printed motif.

2. The method according to claim 1, wherein the deflecting comprises deflecting the continuous ink jet from a default trajectory in one direction or two different directions within a plane that is normal to the default trajectory.

3. The method according to claim 1, wherein generating the continuous ink jet comprises applying an electrostatic field between the nozzle and the substrate.

4. The method according to claim 1, wherein supplying the ink comprises flowing the ink from a reservoir to the nozzle continuously, wherein the ink comprises a polymer solution or a polymer melt.

5. The method according to claim 1, wherein determining the speed of printing of the continuous fiber is performed continuously when collecting the continuous ink jet on the substrate.

6. The method according to claim 1, wherein determining the width of the printed motif comprises analyzing images of a printed item formed by the printed motif.

7. The method according to claim 1, wherein collecting the continuous ink jet comprises causing relative movement between the substrate and the nozzle while the continuous ink jet is deflected.

8. The method according to claim 1, wherein collecting the continuous ink jet comprises moving the substrate or the nozzle in a plane that is normal to a default trajectory of the continuous ink jet.

9. The method according to claim 1, further comprising printing an object comprising a plurality of printed motifs and causing relative movement between the substrate and the nozzle such that the plurality of printed motifs form a motif band.

10. The method according to claim 1, further comprising printing an object comprising a plurality of printed motifs and keeping the substrate fixed in position relative to the nozzle such that the object comprises a plurality of stacked layers, wherein each stacked layer corresponds to one of the plurality of printed motifs.

11. The method according to claim 1, further comprising setting an amplitude of the periodically repeating jet deflection signal above a predefined threshold such that the width of the printed motif is independent of the amplitude of the periodically repeating jet deflection signal.

12. The method according to claim 1, wherein the length of the continuous fiber collected in the period is determined as two times a square root of a square of the width of the printed motif plus a square of a distance translated by the substrate in half of the period.

13. The method according to claim 1, wherein the length of the continuous fiber collected in the period is determined as two times the width of the printed motif divided by a sine of an angle between a first direction of deflecting the continuous ink jet and a second direction of translating the substrate.

14. The method according to claim 1, wherein the length of the continuous fiber collected in the period is determined as a product of the width of the printed motif and Pi ($\pi$).

15. A device, comprising:
a nozzle configured to generate a continuous ink jet, wherein the continuous ink jet carries a net electrostatic charge;
one or more jet deflection electrodes configured to deflect the continuous ink jet periodically in response to application of a periodically repeating jet deflection signal to form a continuous fiber on a substrate, wherein the periodically repeating jet deflection signal is configured to cause the continuous fiber to form a printed motif during a period of the periodically repeating jet deflection signal; and
a computer configured to determine a width of the printed motif, determine a length of the continuous fiber formed during the period based on a predefined function of the width of the printed motif, and determine a speed of printing the continuous fiber as a product of a frequency of the periodically repeating jet deflection signal and the length of the continuous fiber formed during the period.

16. The device according to claim 15, further comprising one or more waveform generators configured to generate a voltage signal provided to the one or more jet deflection electrodes as the periodically repeating jet deflection signal.

17. The device according to claim 16, further comprising one or more amplifiers connected to the one or more jet deflection electrodes and configured to amplify the voltage signal generated by the one or more waveform generators.

18. The device according to claim 15, wherein the computer is configured to control at least one of deflection of the continuous ink jet and relative movement of the substrate with respect to the nozzle.

19. The device according to claim 15, wherein an opening of the nozzle is wider than a diameter of the continuous ink jet.

20. The device according to claim 15, further comprising one or more cameras configured to capture images of the printed motif, based on which the width of the printed motif can be determined by analyzing the images by the computer.

\* \* \* \* \*